(12) United States Patent
Powell et al.

(10) Patent No.: US 7,929,932 B2
(45) Date of Patent: Apr. 19, 2011

(54) REMOVING HARMONIC AND CO-EXISTENCE INTERFERENCE IN RADIO RECEIVERS

(75) Inventors: Clive A. Powell, Swindon (GB);
Nicholas P. Cowley, Wroughton (GB);
William L. Barber, NR Bampton (GB)

(73) Assignee: Intel Corporation, Santa Clara, CA (US)

( * ) Notice: Subject to any disclaimer, the term of this patent is extended or adjusted under 35 U.S.C. 154(b) by 863 days.

(21) Appl. No.: 11/861,296

(22) Filed: Sep. 26, 2007

(65) Prior Publication Data

US 2009/0081975 A1    Mar. 26, 2009

(51) Int. Cl.
*H04B 1/18* (2006.01)
*H04N 5/44* (2006.01)

(52) U.S. Cl. ............. 455/188.2; 455/191.1; 455/178.1; 455/187.1; 455/180.2; 348/725

(58) Field of Classification Search ........... 455/188.2, 455/191.1, 178.1, 187.1, 180.2, 179.1, 180.1, 455/180.4, 184.1, 188.1, 189.1, 190.1, 191.2, 455/191.3, 193.1, 197.3, 199.1, 307, 290, 455/296, 266, 339–340; 348/307, E5.68, 731, E5.096, 725; 333/175–176, 167, 24 C; 327/553–554, 557

See application file for complete search history.

(56) References Cited

U.S. PATENT DOCUMENTS

| | | | |
|---|---|---|---|
| 6,438,361 B1 * | 8/2002 | Chong et al. | 455/188.1 |
| 6,522,870 B1 * | 2/2003 | Tinaphong et al. | 455/234.1 |
| 7,519,339 B2 * | 4/2009 | Shah | 455/130 |
| 7,538,621 B2 * | 5/2009 | Birleson et al. | 331/16 |
| 2004/0205821 A1 * | 10/2004 | Yamada et al. | 725/80 |
| 2006/0040628 A1 * | 2/2006 | Porret et al. | 455/234.1 |
| 2008/0198269 A1 * | 8/2008 | Gomez | 348/707 |
| 2010/0156562 A1 * | 6/2010 | Kim | 333/174 |
| 2010/0156575 A1 * | 6/2010 | Shah et al. | 334/78 |
| 2010/0167673 A1 * | 7/2010 | Vavelidis et al. | 455/150.1 |

* cited by examiner

*Primary Examiner* — Pablo N Tran
(74) *Attorney, Agent, or Firm* — Alan Pedersen-Giles

(57) ABSTRACT

A wireless device includes a two-stage filter that separates UHF and VHF transmission bands in such a way as to maximize cross channel isolation, so preventing cross channel signal contamination and additionally protecting all signals from host coexistence blocking transmissions and harmonics of the wanted signals without the requirement for additional or selectable filter arrangements.

18 Claims, 3 Drawing Sheets

REMOVING HARMONIC AND CO-EXISTENCE INTERFERENCE IN RADIO RECEIVERS

The proliferation of mobile computing devices including laptops, Personal Digital Assistants (PDAs) and smart phones has created a demand for services now live and available to consumers. A key challenge to receiving these services is adapting to a hostile radio environment that includes noise, time-varying channels, and abundant electromagnetic interference. Some radio architectures rely on selecting front end filters by means of switches to cover multiple bands of operation. The harmonics of the wanted signals in certain bands can be frequency converted and the receiver desensitized. To minimize signal interference that results in performance degradation, a radio architecture is needed that provides a better way to accommodate communications in the presence of interfering signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
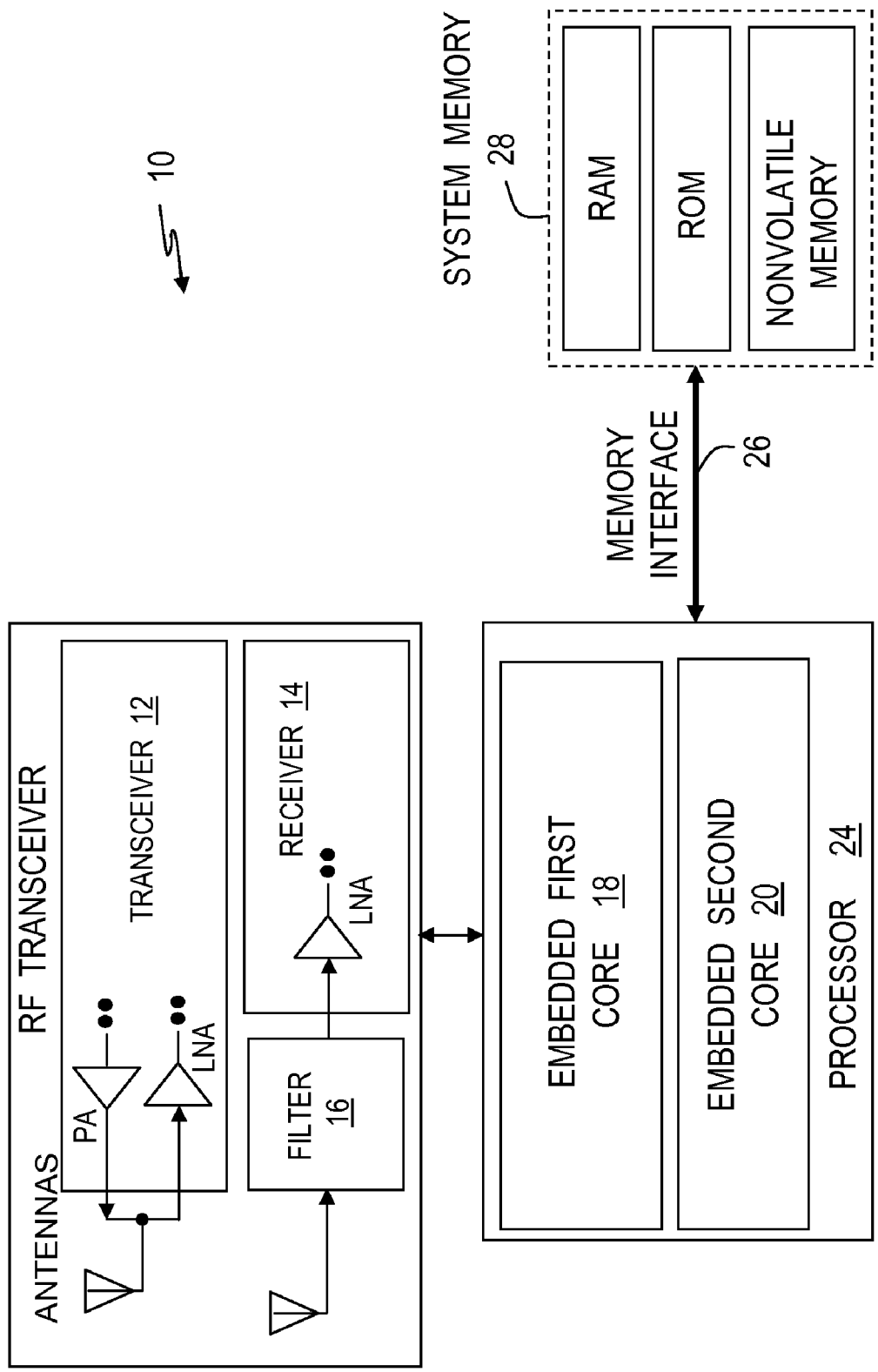
FIG. 1 illustrates a filter placed between an antenna and the RF modules that eliminates the requirement for a selectable Surface Acoustic Wave (SAW) or ceramic filter in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The embodiment illustrated in FIG. 1 shows a wireless communications device 10 that includes multiple radios to allow communication with other over-the-air communication devices. Communications device 10 may operate in a number of systems such as, for example, Digital Video Broadcasting-Handheld (DVB-H) that brings broadcast services to handheld receivers as adopted in the ETSI standard EN 302 304; Digital Multimedia Broadcasting (DMB); Digital Video Broadcasting-Terrestrial (DVB-T); the Integrated Services Digital Broadcasting-Terrestrial (ISDB-T) in Japan; or Wireless Fidelity (Wi-Fi) that provides the underlying technology of Wireless Local Area Network (WLAN) based on the IEEE 802.11n specifications, although the present invention is not limited to operate in only these networks. Thus, the radio subsystems co-located in communications device 10 provide the capability of communicating in an RF/location space with other devices in a network.

The simplistic embodiment illustrates one or more antenna(s) to receive host transmissions such as WWAN, WiFi, etc., that are coupled to a transceiver 12 to accommodate modulation/demodulation. Also shown is a receiver/tuner 14 that receives "data bits" used to make a TV picture and sound in the Digital television (DTV) broadcasting technology. The multiple transmission bands typically received through a common antennae are passed to a tuner in the notebook digital television receiver. In accordance with the present invention a filter 16 may be used to resolve communications, reduce signal interference from the unwanted bands, and improve the signal quality of the desired channel.

Appropriate to the received MPEG-2 transport streams and the different technical constraints of the received data, a demodulation scheme may be selected to provide the demodulated signals to a processor 24. By way of example, the receiver may include OFDM blocks with pilot signals and the digital demodulation schemes may employ QPSK, DQPSK, 16QAM and 64QAM, among other schemes. The analog transceiver 12 and receiver/tuner 14 may be embedded with a processor 24 as a mixed-mode integrated circuit where baseband and applications processing functions may be handled by processor cores 18 and 20. The processor may transfer data through an interface 26 to memory storage in a system memory 28.

In this embodiment a Surface Acoustic Wave (SAW) or ceramic filter is eliminated from the receiver path and the DVB signals from a single antenna are received by filter 16 and separated in the VHF and UHF frequency bands and presented to the input of a Radio. The Very High Frequency (VHF) radio frequency range is from 30 MHz to 300 MHz and the Ultra High Frequency (UHF) designates a range or band of electromagnetic waves whose frequency is between 300 MHz and 3 GHz.

In addition to separating the DVB signals, filter 16 protects the radio receiver from harmonics of wanted signals and from unwanted signals in a coexistence environment. By separating the received modulated signal into the required frequency bands the harmonics of the wanted signal and unwanted coexistent signals may be eliminated. Thus, the architecture of filter 16 reduces the need for switches, switch control ports and software selection to provide a significant reduction in hardware overhead.

Figure 2:
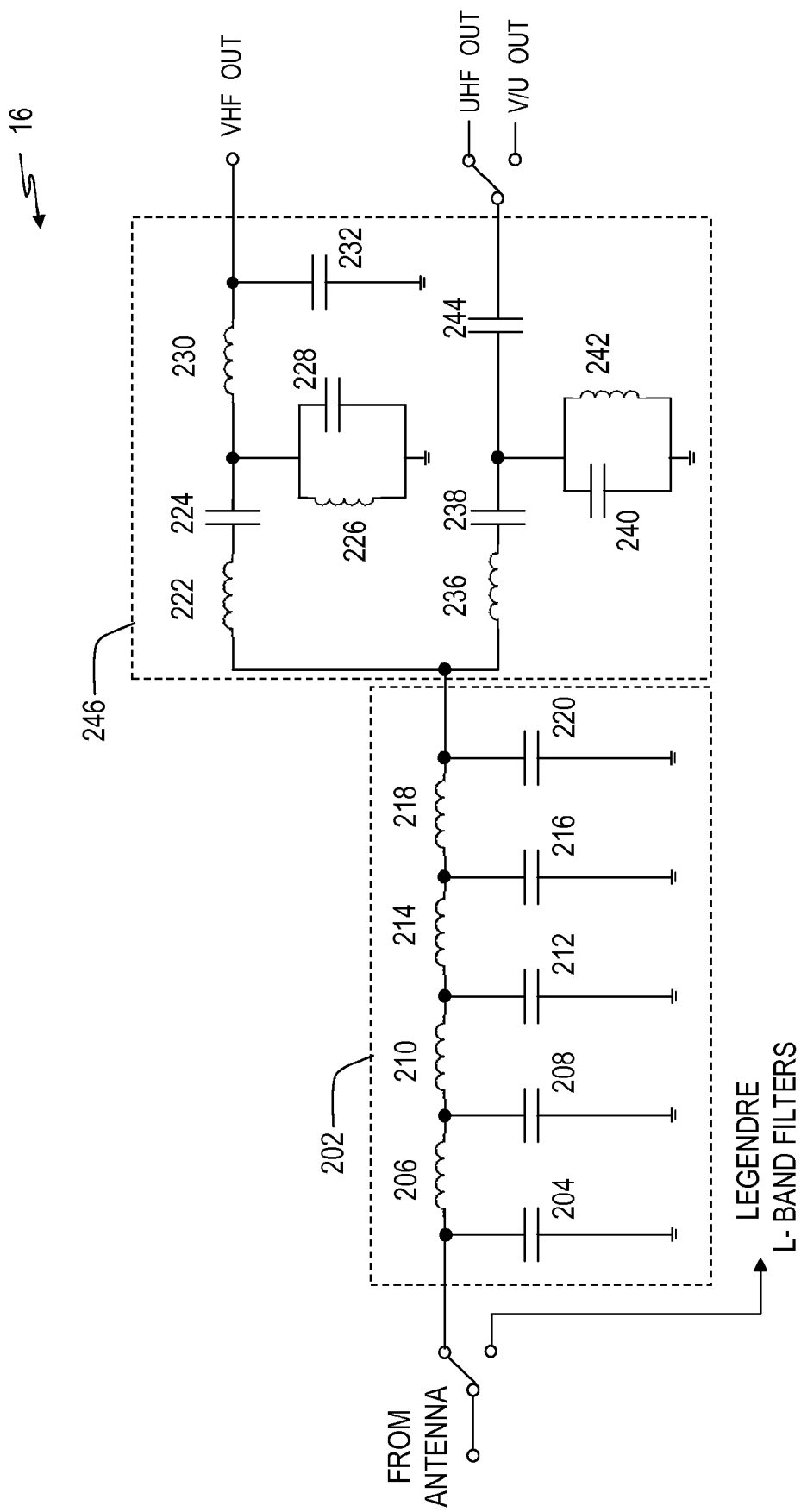
FIG. 2 is a schematic diagram of the filter in accordance with the present invention.

FIG. 2 is a schematic diagram showing the design of the front end filter 16. The design is a cascade of two filters, where the first filter, i.e., the WiFi filter 202, performs a low pass filtering function to attenuate coexisting signals such as, for example, GSM 1800 and WiFi signals and harmonics of the wanted signal. The second filter, i.e., filter 246, performs three functions that include separating the received signals into the UHF and the VHF bands, providing a band-pass filtering function for both bands, and providing additional roll-off for the WiFi filter to meet attenuation specifications for harmonic rejection and give improved rejection performance for GSM1800 and WiFi signals.

The illustrated filter design receives signals from the antenna and separates different transmission bands such as, for example, VHF3 and UHF bands, in such a way as to maximize cross channel isolation. This prevents cross channel signal contamination and additionally protects all signals from host coexistence blocking transmissions without the requirement for additional filter arrangements. The network connectivity in WiFi filter 202 shows signals received from the antennae passing through a series of inductors 206, 210, 214, and 218 that in this embodiment have respective inductance values of 6.2 nH, 12 nH, 12 nH, and 6.2 nH.

In addition, capacitors couple the serially connected inductor terminals to a common ground power supply conductor. Specifically, a capacitor 204 couples one terminal of inductor 206 to the power supply conductor and a capacitor 208 couples the commonly connected terminals of inductors 206 and 210 to the power supply conductor. Further, a capacitor 212 couples the commonly connected terminals of inductors 210 and 214 to the power supply conductor and a capacitor 216 couples the commonly connected terminals of inductors 214 and 218 to the power supply conductor. The other terminal of inductor 218 provides the output signal of the first filter stage. A capacitor 220 couples the output terminal of WiFi filter 202 to the power supply conductor. The capacitors 204, 208, 212, 216, and 220 have capacitor values in this embodiment respectively of 1.0 pF, 3.9 pF, 5.1 pF, 3.9 pF and 1.0 pF. It should be noted that other embodiments of WiFi filter 202 may have different inductance values and different capacitance values without affecting the scope of the claimed invention.

As already mentioned the second filter 246 separates the received signals into the UHF and the VHF bands and provides a band-pass filtering function for both bands. In generating the VHF output signal, the output of WiFi filter 202 connects to an inductor 222 (inductance of 75 nH) that is serially connected to a capacitor 224 (capacitance of 11 pF). The other terminal of capacitor 224 is coupled through a tank circuit that includes inductor 226 (inductance of 27 nH) and capacitor 228 (capacitance of 39 pF) to the power supply conductor. In addition to one terminal of capacitor 224 connecting to the tank circuit, that terminal is also connected to a terminal of an inductor 230 (inductance of 40 nH). The other terminal of inductor 230 provides the VHF output signal. A capacitor 232 (capacitance of 9 pF) couples the VHF output terminal to the power supply conductor.

The second filter 246 also provides the UHF signal. In generating the UHF output signal, the output of filter 202 connects to an inductor 236 (inductance of 12 nH) that is serially connected to a capacitor 238 (capacitance of 5.1 pF). The other terminal of capacitor 238 is coupled through a tank circuit that includes capacitor 240 (capacitance of 4.7 pF) and inductor 242 (inductance of 13 nH) to the power supply conductor. A capacitor 244 (capacitance of 100 pF) has one terminal that connects to the tank circuit and to a terminal of capacitor 238 and the other terminal that provides the UHF output signal.

Figure 3:
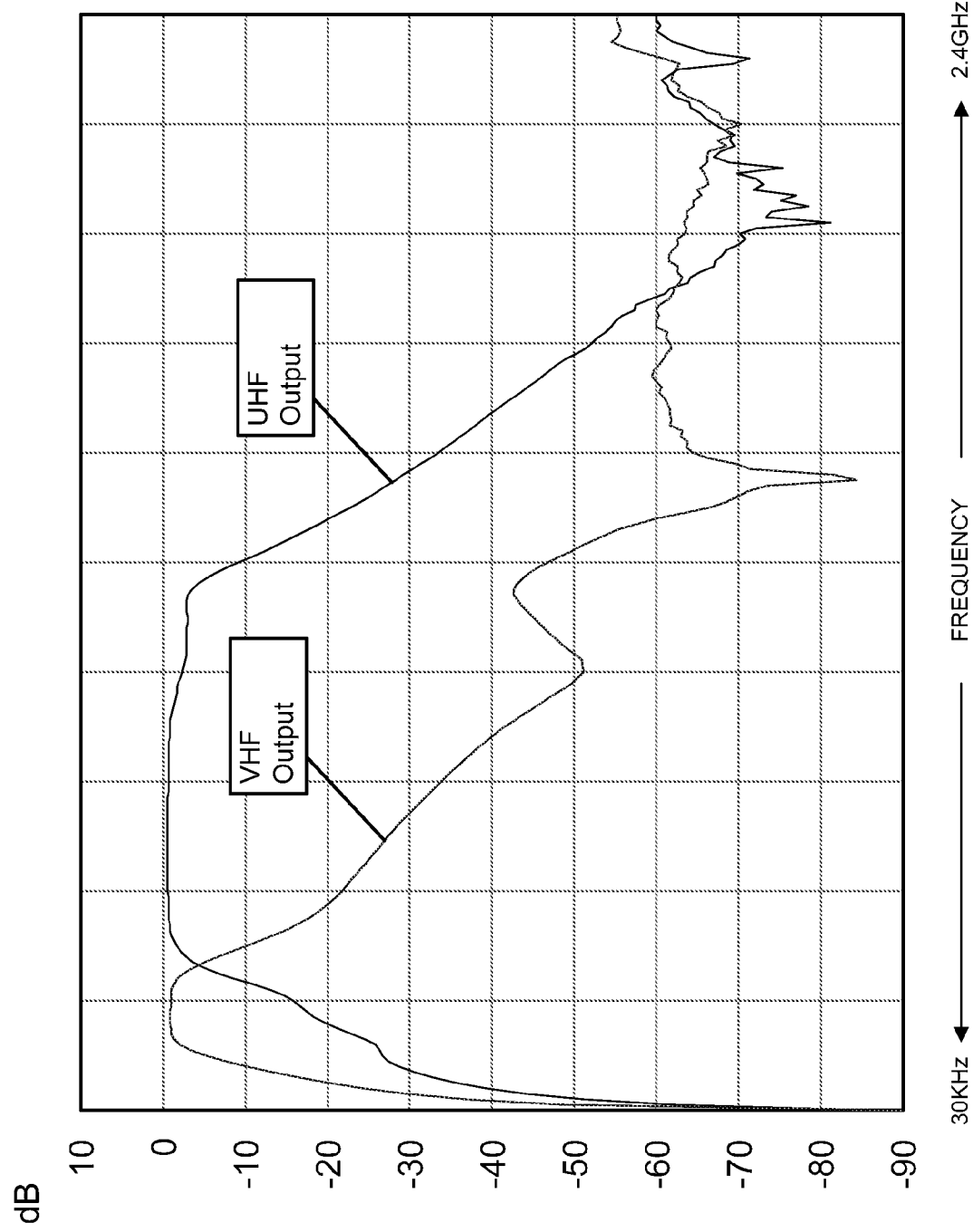
FIG. 3 is a measured response of a signal passing from the antenna through the filter to the UHF output port and the VHF output port shown in FIG. 2.

FIG. 3 is a measured response of the signal passing from the antenna through filter 16 to the UHF output port and the VHF output port. The horizontal axis is the frequency response measured over a 30 kHz to 2.4 GHz frequency range. The response shows the received signals are separated into the UHF and the VHF bands and a band-pass filtering function is performed for both bands. Note that the response further shows the low pass filtering function that attenuates GSM 1800 signals in the 1710 to 1785 MHz range used to send information from the mobile station to the base in the uplink and the 1805 to 1880 MHz range used to send information in the downlink. The measured response also shows the low pass filtering for WiFi signals in the Industrial, Scientific and Medical (ISM) band that ranges from 2.4 to 2.47 GHz. It may also be observed from the measured response that harmonics of the wanted signal are attenuated.

By now it should be apparent that the complexity of a wireless device communicating in different networks may be mitigated using features of the present invention. The described filter design includes a network that separates different transmission bands in such a way as to maximize cross channel isolation, so preventing cross channel signal contamination and additionally protecting all signals from host coexistence blocking transmissions and harmonics of the wanted signal without the requirement for additional filter arrangements.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A radio, comprising:
an antenna to receive signals; and
a front end filter coupled to the antenna that is a cascade of at least two filters that separates the received signals into two or more bands,
wherein the cascade of at least two filters includes a first filter to perform a low pass filtering function using four serially connected inductors with capacitors coupling inductor terminals to a ground power conductor and a second filter to separate the received signals into two different frequency bands,
wherein the second filter comprises:
a first inductor having a first terminal connected to an output of the first filter;
a first capacitor having a first terminal connected to a second terminal of the first inductor;
a second inductor in parallel with a second capacitor and coupled between a second terminal of the first capacitor and the ground power conductor;
a third inductor having a first terminal coupled to the second terminal of the first capacitor; and
a third capacitor coupled between the second terminal of the third inductor and the ground power conductor.

2. The radio of claim 1, wherein the two or more bands are contiguous.

3. The radio of claim 1, wherein the two or more bands are not contiguous.

4. The radio of claim 1 the front end filter provides an output band that affords protection from interfering signals within a received signal range which lies outside a frequency pass range of the output band.

5. The radio of claim 1 wherein a separation of the two or more bands is achieved by passive means without switching arrangements.

6. The radio of claim 1, wherein the two bands are an Ultra High Frequency (UHF) band and a Very High Frequency (VHF) band.

7. The radio of claim 1 wherein the front end filter eliminates a need for a selectable Surface Acoustic Wave (SAW) or ceramic filter in a receiver path.

8. The radio of claim 1 wherein a VHF output in the second filter is supplied from the second terminal of the third inductor.

9. The radio of claim 1 wherein the second filter further comprises:
a fourth inductor having a first terminal connected to the output of the first filter;
a fourth capacitor having a first terminal connected to a second terminal of the fourth inductor;
a fifth inductor and a fifth capacitor connected in parallel and coupled between a second terminal of the fourth capacitor and the ground power conductor; and a fifth capacitor coupled between the second terminal of the fourth capacitor and a UHF output of the second filter.

10. A radio of a communication device, comprising:
an antenna to receive digital television signals; and
a first filter stage having four serially connected inductors with capacitors coupling each inductor terminal to a ground power conductor, where the first filter stage receives the digital television signals; and
a second filter stage connected to the first filter stage to separate the digital television signals into an Ultra High Frequency (UHF) band and a Very High Frequency (VHF) band,
wherein the second filter stage includes a VHF path having a first inductor in series with a first capacitor, a second inductor and a second capacitor connected in parallel between a terminal of the first capacitor and the ground power conductor, and a third inductor connected to the first capacitor, the second inductor and the second capacitor, where a terminal of the third inductor provides a VHF output signal.

11. The radio of claim 10 wherein the second filter stage further includes a UHF path having a fourth inductor in series with a fourth capacitor, a fifth inductor and a fifth capacitor connected in parallel between a second terminal of the fourth capacitor and the ground power conductor, and a sixth capacitor connected to the fourth capacitor, the fifth inductor and the fifth capacitor, where a terminal of the sixth capacitor provides a UHF output signal.

12. The radio of claim 10 wherein the first filter stage performs a low pass filtering function to attenuate coexisting signals GSM 1800, WiFi signals, and harmonics of an wanted signal.

13. The radio of claim 10 wherein the second filter stage provides a band-pass filtering function for the UHF band and the VHF band.

14. The radio of claim 10 wherein the second filter stage provides roll-off for the first filter stage to provide rejection for GSM1800 and WiFi signals.

15. The radio of claim 10 wherein the second filter stage provides additional protection from harmonics of a wanted signal.

16. A two-stage filter comprising:
an input in a first filter stage to receive antenna signals and provide a low pass filtering function using four serially connected inductors with capacitors coupling each inductor terminal to a ground power conductor; and
a first output to provide UHF signals and a second output to provide VHF signals in a second filter stage connected to the first filter stage,
wherein an output of the first filter stage connects to an input of the second filter stage that includes a serial path of a first inductor connected to a first capacitor that is connected to a second inductor to provide the VHF signals,
wherein the second filter stage further includes a parallel pairing of an inductor and capacitor that is coupled from a connection of the first capacitor with the second inductor to a ground power conductor.

17. The two-stage filter of claim 16 wherein the second filter stage further includes a serial path of a third inductor connected to a second capacitor that is connected to a third capacitor to provide the UHF signals.

18. The two-stage filter of claim 17 wherein the second filter stage further includes a parallel pairing of an inductor and capacitor that is coupled from a connection of the second capacitor with the third capacitor to a ground power conductor.

* * * * *